(12) United States Patent
Binno

(10) Patent No.: US 6,418,770 B1
(45) Date of Patent: Jul. 16, 2002

(54) METHOD FOR IMPROVING THE FATIGUE LIFE OF A TUBULAR STABILIZER BAR

(75) Inventor: Michael Peter Binno, Troy, MI (US)

(73) Assignee: Meritor Suspension Systems Company, Troy, MI (US)

(*) Notice: Subject to any disclaimer, the term of this patent is extended or adjusted under 35 U.S.C. 154(b) by 0 days.

(21) Appl. No.: 09/732,688

(22) Filed: Dec. 8, 2000

(51) Int. Cl.⁷ .................. B21D 39/20; B21D 26/02
(52) U.S. Cl. ................. 72/58; 72/370.22; 29/897.2
(58) Field of Search ........................ 72/58, 60, 61, 72/370.22; 29/1.11, 446, 897.2

(56) References Cited

U.S. PATENT DOCUMENTS

| | | | |
|---|---|---|---|
| 1,329,762 A | * 2/1920 | Guy | 29/1.11 |
| 1,391,009 A | * 9/1921 | Schneider | 29/1.11 |
| 1,391,010 A | * 9/1921 | Schneider | 29/1.11 |
| 1,602,282 A | * 10/1926 | Methlin | 72/56 |
| 3,140,535 A | 7/1964 | Pechacek | |
| 3,438,113 A | 4/1969 | Berman et al. | |
| 3,438,114 A | 4/1969 | Berman et al. | |
| 3,751,954 A | 8/1973 | Ezra et al. | |
| 4,075,926 A | 2/1978 | Eriksson et al. | |
| 4,163,561 A | 8/1979 | Butler | |
| 4,354,371 A | * 10/1982 | Johnson | 72/53 |
| 4,417,459 A | 11/1983 | Tomita | |
| 4,571,969 A | 2/1986 | Tomita | |
| 5,177,990 A | 1/1993 | Isgen | |
| 5,481,892 A | * 1/1996 | Roper et al. | 72/61 |
| 5,605,449 A | 2/1997 | Reed | |
| 5,837,921 A | 11/1998 | Rinaldi et al. | |
| 5,927,119 A | * 7/1999 | Hamano et al. | 72/58 |
| 6,065,502 A | * 5/2000 | Horton | 72/61 |
| 6,122,948 A | * 9/2000 | Moses | 72/61 |
| 6,183,013 B1 | * 2/2001 | Mackenzie et al. | 72/61 |

* cited by examiner

Primary Examiner—David Jones
(74) Attorney, Agent, or Firm—Carlson Gaskey & Olds

(57) ABSTRACT

An autofrettage process employed on the inner surface of a tubular stabilizer bar. Road shock and other vibrations subject the stabilizer bar to tensile stresses. Tensile stresses cause fractures and decrease the fatigue life of the bar. In employing an autofrettage process, a pressurized fluid is introduced into the interior space of a sealed stabilizer bar, slightly increasing the inner diameter of the stabilizer bar. As the inner surface of the stabilizer bar is deformed, residual compressive stress forces are created which counteract and oppose the tensile stress forces. The residual compressive stress forces prevent the tensile stresses from fracturing the inner surface of the bar, increasing fatigue life. A shot peening process can be employed on the exterior surface of the bar to create residual compressive stress forces which counteract exterior tensile forces.

22 Claims, 1 Drawing Sheet

METHOD FOR IMPROVING THE FATIGUE LIFE OF A TUBULAR STABILIZER BAR

BACKGROUND OF THE INVENTION

The present invention relates generally to a method for improving the fatigue life of a stabilizer bar by employing autofrettage to the inner surface of the stabilizer bar.

Vehicles are commonly equipped with suspension systems for absorbing road shock and other vibrations, while providing for a smooth and comfortable ride. A suspension component, such as a stabilizer bar, is often used to increase roll rigidity and to improve the steering stability of the vehicle.

One common problem with tubular stabilizer bars is that fatigue fractures originate along the inner and outer surface of the tube. Shot peening is employed to relieve tensile stresses and to reduce fractures. In the shot peening process, a plurality of small beads are shot by a machine through an injection nozzle onto the surface of the smooth bar. The force of the small beads deforms the surface of the bar, creating a compressive stress which counteracts the tensile stress from every day use.

Shot peening the outer surface of the stabilizer bar assists in eliminating fractures on the outer surface of the bar. However, shot peening the inner surface of the formed tubular stabilizer bar is difficult due to bends formed in the stabilizer bar, and the nozzle of the machine is unable to access the entire inner surface of the tube. Therefore, in shot peening applications, most fractures will occur on the inner surface of the tube due to the difficulty in applying the shot peening process to the inner surface of the tube in the area of the bends.

Hence, there is a need in the art for a method for improving the fatigue life of a stabilizer bar by employing autofrettage to the inner surface of the stabilizer bar.

SUMMARY OF THE INVENTION

This invention relates to a method for improving the fatigue life of a stabilizer bar by employing autofrettage to the inner surface of the stabilizer bar.

In a preferred embodiment, an autofrettage process is applied to the interior surface of a formed vehicle stabilizer bar. During vehicle operation, the stabilizer bar is subject to tensile stresses caused from road shock and other vibrations. These tensile stresses decrease the fatigue life of the stabilizer bar and cause fractures. By employing an autofrettage process to the formed stabilizer bar, the amount of fractures along the inner surface of the stabilizer bar can be decreased.

In applying the autofrettage process, one end of the formed stabilizer bar is clamped. A pressurized fluid is introduced into the interior space of the stabilizer bar, filling the inner space and slightly increasing the inner diameter. As the inner surface is deformed, compressive stress forces are created.

The compressive stress forces counteract and oppose the tensile stress forces created from vehicle operation and everyday use. By counteracting the tensile stress forces, fractures on the inner surface of the bar can be minimized, increasing the fatigue life of the bar. Because a fluid is utilized, the autofrettage process can be applied to the entire inner surface of the stabilizer bar, including bend areas. Therefore, fewer areas on the interior surface of the stabilizer bar are missed by the autofrettage process, resulting in fewer fractures and a longer fatigue life.

A shot peening process is applied to the exterior surface of the stabilizer bar to minimize fractures on the exterior surface of the bar. A plurality of beads are shot by a machine to deform the exterior surface, creating a plurality of compressive stress forces to counteract the tensile forces.

In another embodiment, the autofrettage method is employed to a tubular torsion bar, increasing the fatigue life of the torsion bar.

Accordingly, the present invention provides a method for improving the fatigue life of a stabilizer bar by employing autofrettage to the inner surface of the stabilizer bar.

These and other features of the present invention will be best understood from the following specification and drawings.

BRIEF DESCRIPTION OF THE DRAWINGS

The various features and advantages of the invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
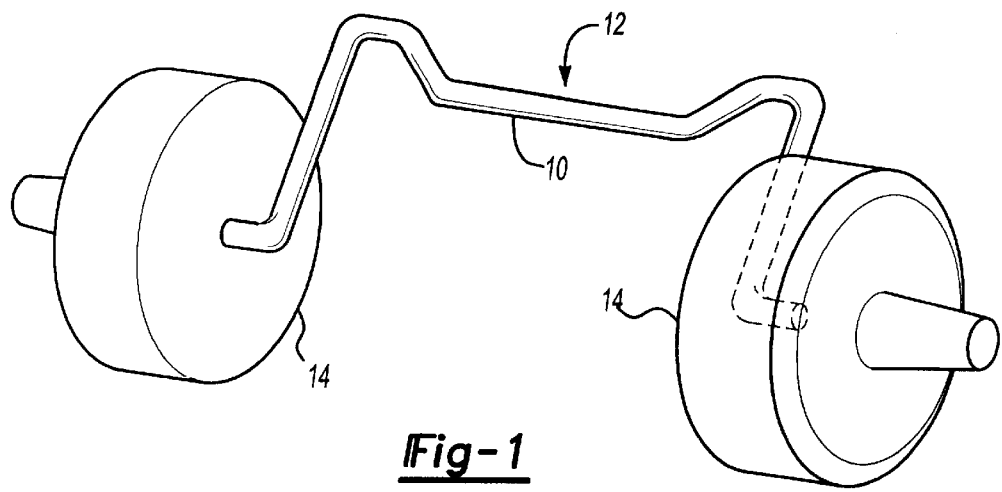
FIG. 1 illustrates a schematic view of a formed stabilizer bar mounted on a vehicle.
Figure 2:
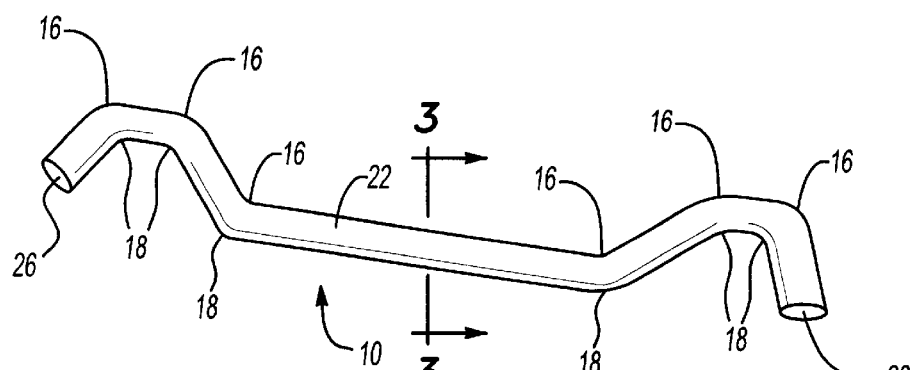
FIG. 2 illustrates a schematic view of a formed stabilizer bar.

FIG. 1 illustrates a stabilizer bar 10 on a vehicle 12 mounted between wheels 14. As known, the stabilizer bar 10 provides a stabilizer function. FIG. 2 illustrates a schematic view of a formed stabilizer bar 10 of a vehicle suspension system. A plurality of bends 16 are created by forming the stabilizer bar 10 at points of formation 18.

Figure 3:
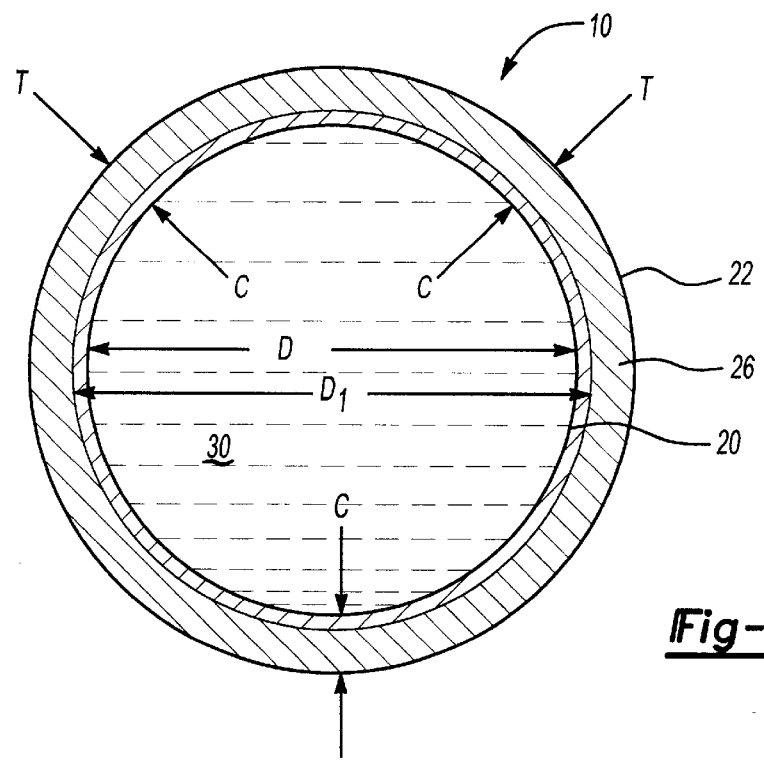
FIG. 3 illustrates an end view of a formed stabilizer bar.

During vehicle operation, road shock and other vibrations apply tensile stresses T to the inner surface 20 and the outer surface 22 of the stabilizer bar 10, as shown in FIG. 3. The tensile stresses T decrease the fatigue life of the stabilizer bar 10, causing fractures.

An autofrettage process is employed to decrease the frequency of fractures along the inner surface 20 of a formed stabilizer bar 10. In employing the autofrettage process, a first end 26 of the formed stabilizer bar 10 is sealed. In the preferred embodiment, the first end 26 is sealed by a clamp. A pressurized fluid is introduced into tile inner space 30 of the stabilizer bar 10 through an injection nozzle of a pump clamped on an opposite second end 28 of the stabilizer bar 10. In the preferred embodiment, the pressurized fluid is a hydraulic fluid, such as oil. The fluid is prevented from escaping the inner space 30 by the clamp located on the first end 26. As the pressure in the inner space 30 increases, the inner diameter D of the stabilizer bar 10 increases slightly to deformed inner diameter $D_1$, plastically deforming the inner surface 20. The outer diameter of the stabilizer bar 10 remains approximately the same. This creates a counteractive residual compressive stress forces C on the inner surface 20.

The compressive stress forces C counteract and oppose the tensile stress forces T. As vehicle operation and everyday use introduces tensile stress forces T on the formed stabilizer bar 10, the compressive stress forces C created from the autofrettage process counteract the tensile stress forces T, minimizing fractures on the interior surface 20 and increasing the fatigue life of the bar 10.

After employing the autofrettage process to the inner surface 20 of the stabilizer bar 10, a shot peening process can be applied to the outer surface 22 to counteract tensile forces T on the outer surface 22. In a shot peening process, a plurality of beads are shot by a machine onto the smooth outer surface 22 of the bar 10, plastically deforming the outer surface 22. The deformation creates residual compressive stress forces C on the outer surface 10 to counteract any tensile stress forces T. This increases the fatigue life of the bar 10 as the number of fractures can be minimized.

Although a stabilizer bar 10 is illustrated, the autofrettage method can also be employed on a tubular torsion bar. By employing the autofrettage process to a torsion bar, the fatigue life of the torsion bar can be increased.

There are several advantages for employing an autofrettage process on the inner surface of a stabilizer bar 10. For one, because fluid is utilized, the autofrettage process can be applied to the entire inner surface 20 of the bar 10, including the areas surrounding the plurality of bends 16. In processes utilizing shot peening on the inner surface 20, the inner bend areas 16 are difficult to reach with the shot peening nozzle. Areas on the inner surface 20 of the stabilizer bar 10 that are missed by the shot peening process are more vulnerable to fractures caused from tensile stresses T. However, because a fluid is used in the autofrettage process, areas on the inner surface 20 of the stabilizer bar 10 that are hard to reach with a shot peening nozzle can be reached. Therefore, fewer areas on the inner surface 20 of the stabilizer bar 10 are missed by the autofrettage process, resulting in fewer fractures and a longer fatigue life.

Additionally, by employing an autofrettage process to the inner surface 20 of the bar 10, the depth of the residual compressive stresses C attainable by the autofrettage process is typically ten times of that which is attainable by the shot peening process. Finally, a maximum of 110,000 to 140,000 pounds per square inch of compressive residual stress force C can be attained by the autofrettage process.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specially described. For that reason the following claims should be studied to determine the true scope and content of this invention.

What is claimed is:

1. A method for improving the fatigue life of a tubular stabilizer bar of a vehicle suspension system having a plurality of bends and an inner diameter comprising the steps of:

sealing an end of said stabilizer bar;

pressurizing an internal surface of an entire length of said stabilizer bar to plastically deform said internal surface to a deformed inner diameter; and producing a plurality of compressive forces on said internal surface.

2. The method as recited in claim 1 wherein said internal surface is pressurized by a hydraulic fluid.

3. The method as recited in claim 2 wherein said hydraulic fluid is oil.

4. The method as recited in claim 2 wherein the step of pressurizing said internal surface of said stabilizer bar includes injecting said hydraulic fluid in an opposing end of said stabilizer bar.

5. The method as recited in claim 1 wherein the step of pressurizing said internal surface of said stabilizer bar further includes pressurizing said plurality of bends on said interior surface of said stabilizer bar.

6. The method as recited in claim 1 wherein said deformed inner diameter is greater than said inner diameter.

7. The method as recited in claim 1 wherein the step of pressurizing said internal surface of said stabilizer bar further includes applying a predetermined pressure.

8. The method as recited in claim 1 wherein the step of pressurizing said internal surface of said stabilizer bar is applied for a predetermined amount of time.

9. The method as recited in claim 1 wherein said plurality of compressive forces counteract a plurality of tensile forces.

10. The method as recited in claim 1 wherein the step of sealing an end of said stabilizer bar includes employing a clamp.

11. The method as recited in claim 1 wherein the step of pressurizing said internal surface of said stabilizer bar further includes not substantially changing an outer diameter of said stabilizer bar.

12. The method as recited in claim 1 wherein the steps of sealing an end of said stabilizer bar, pressurizing said internal surface, and producing said plurality of compressive forces occur after a step of forming said stabilizer bar.

13. A method for improving the fatigue life of a tubular stabilizer bar of a vehicle suspension system having a plurality of bends and an inner diameter comprising the steps of:

sealing an end of said stabilizer bar;

pressurizing an internal surface of an entire length of said stabilizer bar to plastically deform said internal surface to a deformed inner diameter and to produce a plurality of compressive forces on said internal surface; and pressuring an exterior surface of said stabilizer bar by a shot peening process utilizing a plurality of beads.

14. The method as recited in claim 13 wherein said internal surface is pressurized by a hydraulic fluid.

15. The method as recited in claim 14 wherein said hydraulic fluid is oil.

16. The method as recited in claim 13 wherein the step of pressurizing said internal surface of said stabilizer bar further includes pressurizing said plurality of bends on said interior surface of said stabilizer bar.

17. The method as recited in claim 13 wherein said deformed inner diameter is greater than said inner diameter.

18. The method as recited in claim 13 wherein the step of pressurizing said internal surface of said stabilizer bar further includes applying a predetermined pressure.

19. The method as recited in claim 13 wherein the step of pressurizing said internal surface of said stabilizer bar is applied for a predetermined amount of time.

20. The method as recited in claim 13 wherein said plurality of compressive forces counteract a plurality of tensile forces.

21. The method as recited in claim 13 wherein the step of sealing an end of said stabilizer bar includes employing a clamp.

22. A method for improving the fatigue life of a tubular stabilizer bar of a vehicle suspension system having a plurality of bends and an inner diameter comprising the steps of:

sealing an end of said stabilizer bar;

pressurizing an internal surface of an entire length of said stabilizer bar to plastically deform said internal surface to a deformed inner diameter and not substantially changing an outer diameter of said stabilizer bar; and producing a plurality of compressive forces on said internal surface.

* * * * *